(12) United States Patent
Zaarur

(10) Patent No.: US 7,711,873 B1
(45) Date of Patent: May 4, 2010

(54) BANDWIDTH CONTROL AND POWER SAVING BY INTERFACE AGGREGATION

(75) Inventor: Ofer Zaarur, Marlborough, MA (US)

(73) Assignee: Marvell International Ltd., Hamilton (BM)

( * ) Notice: Subject to any disclaimer, the term of this patent is extended or adjusted under 35 U.S.C. 154(b) by 162 days.

(21) Appl. No.: 12/008,339

(22) Filed: Jan. 10, 2008

Related U.S. Application Data

(60) Provisional application No. 60/884,313, filed on Jan. 10, 2007.

(51) Int. Cl.
*G06F 13/00* (2006.01)
(52) U.S. Cl. .............................. 710/35; 710/56; 710/60
(58) Field of Classification Search ............. 710/10–12, 710/14, 16–18, 35, 56, 59, 60
See application file for complete search history.

(56) References Cited

U.S. PATENT DOCUMENTS

| | | | | |
|---|---|---|---|---|
| 5,946,634 A * | 8/1999 | Korpela | ................... | 455/552.1 |
| 6,138,012 A * | 10/2000 | Krutz et al. | ................. | 455/427 |
| 6,407,993 B1 * | 6/2002 | Moulsley | .................... | 370/347 |
| 6,801,777 B2 * | 10/2004 | Rusch | ..................... | 455/452.2 |
| 6,886,057 B2 * | 4/2005 | Brewer et al. | ................. | 710/63 |
| 7,043,569 B1 * | 5/2006 | Chou et al. | .................... | 710/8 |
| 7,246,181 B2 * | 7/2007 | Rosing | ........................ | 710/18 |
| 7,363,395 B2 * | 4/2008 | Seto | ........................... | 710/11 |

OTHER PUBLICATIONS

Definition of Circular Buffer from Wikipedia.com <http://en.wikipedia.org/wiki/Circular_buffer>, accessed on Jun. 12, 2009.*

* cited by examiner

*Primary Examiner*—Khanh Dang

(57) ABSTRACT

A first processor that executes at least one application or process includes a first interface module that interfaces the first processor to a second processor and that includes N interfaces. N is an integer greater than 1. The first processor also includes a first communication control module (CCM) that selects M of the N interfaces based on bandwidth requested by the at least one application to transmit data generated by the at least one application to the second processor.

31 Claims, 13 Drawing Sheets

BANDWIDTH CONTROL AND POWER SAVING BY INTERFACE AGGREGATION

CROSS-REFERENCE TO RELATED APPLICATIONS

This application claims the benefit of U.S. Provisional Application No. 60/884,313, filed on Jan. 10, 2007. The disclosure of the above application is incorporated herein by reference in its entirety.

FIELD

The present disclosure relates to electronic data processing systems, and more particularly to optimizing bandwidth and power consumption of electronic devices by aggregating hardware interfaces.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1, a device 10 may execute applications that process large amounts of data. For example only, the device 10 may comprise a personal digital assistant (PDA), a wireless network device, or a cellular phone. Additionally, the device 10 may transmit and receive large amounts of data to and from other devices. Accordingly, the device 10 may comprise an application processor (AP) 12 and a communication processor (CP) 14. The AP 12 may execute the applications that process the data. The CP 14 may communicate with the AP 12, transmit data received from the AP 12 to other devices, and provide data received from other devices to the AP 12.

The AP 12 and the CP 14 may comprise one or more hardware interfaces I/F1, I/F2, . . . , and I/Fn, where n is an integer greater than 1. The hardware interfaces I/F1, I/F2, . . . , and I/Fn may include universal asynchronous receiver/transmitters (UARTs), universal synchronous bus (USB) interfaces, secure digital input/output (SDIO) interfaces, and/or serial peripheral interfaces (SPIs) and/or other types of interfaces. The AP 12 and the CP 14 may communicate with each other via the hardware interfaces I/F1, I/F2, . . . , and I/Fn.

SUMMARY

A first processor that executes at least one application includes a first interface module that interfaces the first processor to a second processor and that includes N interfaces. N is an integer greater than 1. The first processor also includes a first communication control module (CCM) that selects M of the N interfaces based on bandwidth requested by the at least one application to transmit data generated by the at least one application to the second processor.

In other features, the first processor includes an application processor (AP), and the second processor includes a communication processor (CP). The CCM sets each of (N-M) of the N interfaces to one of low-power and power-off modes. M is an integer and $1 \leq M \leq N$. A system includes the first processor and the second processor. The second processor includes a second interface module that communicates with the first interface module and that includes P interfaces. P is an integer greater than 1. The second processor also includes a second CCM that selects R of the P interfaces to transmit data to the first processor. R is an integer and $1 \leq R \leq P$. The second CCM sets each of (P-R) of the P interfaces to one of low-power and power-off modes. The second CCM selects R of the P interfaces to transmit data to the first processor based on a rate at which the second processor receives data from devices other than the first processor, where P=N.

In other features, a processor, such as an AP or a CP, may be implemented by an integrated circuit (IC). The N and P interfaces include at least one of universal asynchronous receiver/transmitters (UARTs), universal synchronous bus (USB) interfaces, secure digital input/output (SDIO) interfaces, and serial peripheral interfaces (SPIs) and/or other types of interfaces In other features, the first CCM includes a transmit buffer that buffers data generated by the at least one application. The first CCM further includes a splitter module that splits the data into first portions and that outputs the first portions to the M interfaces based on data rates of the M interfaces when M>1. 11. The splitter splits the data into a plurality of portions based on a number the M and R interfaces that are active. The first CCM further includes an aggregator module that reorders second portions of data received from the M interfaces in an order transmitted by the R interfaces. The first CCM further includes a receive buffer that stores the second portions and that outputs the second portions to the at least one application. The first CCM selects the M interfaces based on amounts of data in at least one of the transmit buffer and the receive buffer. The transmit buffer and the receive buffer are circular buffers.

In other features, the second CCM includes a transmit buffer that buffers data received from devices other than the first processor. The second CCM also includes a splitter module that splits the data into first portions and that outputs the first portions to the R interfaces based on data rates of the R interfaces when R>1. The second CCM further includes an aggregator module that reorders second portions of data received from the R interfaces in an order transmitted by the M interfaces. The second CCM further includes a receive buffer that stores the second portions for communicating the second portions to the devices. The second CCM selects the R interfaces based on amounts of data in at least one of the transmit buffer and the receive buffer.

In other features, the transmit buffer and the receive buffer are circular buffers. The first processor is implemented by a first device, and the second processor is implemented by a second device that is separate logically and or physically from the first device. The first CCM adds sequence identifiers to portions of data transmitted by the M interfaces when M>1. The second CCM reorders the portions received by the R interfaces based on the sequence identifiers.

In other features, a device includes the system and also includes one of a communication device, a mass storage device, a transmitter, and a receiver. The communication device includes one of a mobile computing device, wireless network device, and a cellular phone. The mass storage device includes a hard disk drive (HDD), a compact disc (CD) drive, and a digital versatile disc (DVD) drive. The CCM sets one of the low-power and power-off modes based on a predetermined amount of time that at least one the N interfaces is not at least one of transmitting and receiving the data.

In other features, a first processor control method for executing at least one application includes interfacing the first processor to a second processor via N interfaces. N is an integer greater than 1. The method also includes selecting M of the N interfaces based on bandwidth requested by the at least one application to transmit data generated by the at least one application to the second processor.

In other features, the method includes setting each of (N-M) of the N interfaces to one of low-power and power-off modes based on a predetermined amount of time that at least one the N interfaces is not at least one of transmitting and receiving the data. M is an integer, and $1 \leq M \leq N$. The method also includes selecting R of P interfaces to transmit data to the first processor in a first interface module that includes the N interfaces. A second interface module includes the P interfaces and communicates with the first interface module. R is an integer and $1 \leq R \leq P$, and P is an integer greater than 1.

In other features, the method includes selecting R of the P interfaces to transmit data to the first processor based on a rate at which the second processor receives data from devices other than the first processor, wherein P=N. The method also includes buffering data generated by the at least one application and splitting the data into first portions. The method also includes outputting the first portions to the M interfaces based on data rates of the M interfaces when M>1. The method also includes reordering second portions of data received from the M interfaces in an order transmitted by the R interfaces and storing the second portions.

In other features, the method includes outputting the second portions to the at least one application. The method also includes buffering data received from devices other than the first processor and splitting the data into first portions. The method also includes outputting the first portions to the R interfaces based on data rates of the R interfaces when R>1. The method also includes reordering second portions of data received from the R interfaces in an order transmitted by the M interfaces.

In other features, the method includes storing the second portions for communicating the second portions to the devices. The method also includes adding sequence identifiers to portions of data transmitted by the M interfaces when M>1. The method also includes reordering the portions received by the R interfaces based on the sequence identifiers.

In other features, an application processor (AP) that executes at least one application includes first interface means for interfacing the AP with a processor means for communicating. The first interface means also includes N interface means for interfacing. N is an integer greater than 1. The AP also includes first communication control means for selecting M of the N interface means based on bandwidth requested by the at least one application to transmit data generated by the at least one application to the processor means.

In other features, the communication control means sets each of (N-M) of the N interface means to one of low-power and power-off modes. M is an integer and $1 \leq M \leq N$. A system includes the AP and the processor means. The processor means includes second interface means for communicating with the first interface means. The second interface means also includes P interface means for interfacing. P is an integer greater than 1. The processor means also includes second communication control means for selecting R of the P interface means to transmit data to the AP. R is an integer and $1 \leq R \leq P$. The second communication control means sets each of (P-R) of the P interface means to one of low-power and power-off modes. The second communication control means selects R of the P interface means to transmit data to the AP based on a rate at which the processor means receives data from devices other than the AP, wherein P=N.

In other features, the AP and the processor means are implemented by an integrated circuit (IC). The N and P interface means include at least one of universal asynchronous receiver/transmitters (UARTs), universal synchronous bus (USB) interfaces, secure digital input/output (SDIO) interfaces, and serial peripheral interfaces (SPIs) and/or other types of interfaces.

In other features, the first communication control means includes transmit buffer means for buffering data generated by the at least one application. The first communication control means further includes splitter means for splitting the data into first portions and for outputting the first portions to the M interface means based on data rates of the M interface means when M>1. The first communication control means further includes aggregator means for reordering second portions of data received from the M interface means in an order transmitted by the R interface means. The first communication control means further includes receive buffer means for storing the second portions and for outputting the second portions to the at least one application. The first communication control means selects the M interface means based on amounts of data in at least one of the transmit buffer means and the receive buffer means. The transmit buffer means and the receive buffer means are circular buffers.

In other features, the second communication control means includes transmit buffer means for buffering data received from devices other than the AP. The second communication control means also includes splitter means for splitting the data into first portions and for outputting the first portions to the R interfaces based on data rates of the R interfaces when R>1. The second communication control means further includes aggregator means for reordering second portions of data received from the R interfaces in an order transmitted by the M interface means. The second communication control means further includes receive buffer means for storing the second portions and for communicating the second portions to the devices. The second communication control means selects the R interface means based on amounts of data in at least one of the transmit buffer means and the receive buffer means.

In other features, the transmit buffer means and the receive buffer means are circular buffers. The AP is implemented by a first device, and the processor means is implemented by a second device that is separate from the first device. The first communication control means adds sequence identifiers to portions of data transmitted by the M interface means when M>1. The second communication control means reorders the portions received by the R interface means based on the sequence identifiers.

In other features, a device includes the system and also includes one of a communication device, a mass storage device, a transmitter, and a receiver. The communication device includes one of a mobile computing device, wireless network device, and a cellular phone. The mass storage device includes a hard disk drive (HDD), a compact disc (CD) drive, and a digital versatile disc (DVD) drive. The communication control means sets one of the low-power and power-off modes based on a predetermined amount of time that at least one of the N interface means is not at least one of transmitting and receiving the data.

In still other features, the systems and methods described above are implemented by a computer program executed by one or more processors. The computer program can reside on a computer readable medium such as but not limited to memory, non-volatile data storage and/or other suitable tangible storage mediums.

In other features a computer program for controlling first processor that executes at least one application includes interfacing the first processor to a second processor via N interfaces. N is an integer greater than 1. The computer program also includes selecting M of the N interfaces based on bandwidth requested by the at least one application to transmit data generated by the at least one application to the second processor.

In other features, the computer program includes setting each of (N-M) of the N interfaces to one of low-power and power-off modes based on a predetermined amount of time that at least one the N interfaces is not at least one of transmitting and receiving the data. M is an integer and $1 \leq M \leq N$. The computer program also includes selecting R of P interfaces to transmit data to the first processor in a first interface module that includes the N interfaces, where a second interface module includes the P interfaces and communicates with the first interface module. R is an integer and $1 \leq R \leq P$, and P is an integer greater than 1.

In other features, the computer program includes selecting R of the P interfaces to transmit data to the first processor based on a rate at which the second processor receives data from devices other than the first processor, wherein P=N. The computer program also includes buffering data generated by the at least one application and splitting the data into first portions. The computer program also includes outputting the first portions to the M interfaces based on data rates of the M interfaces when M>1. The computer program also includes reordering second portions of data received from the M interfaces in an order transmitted by the R interfaces and storing the second portions.

In other features, the computer program includes outputting the second portions to the at least one application. The computer program also includes buffering data received from devices other than the first processor and splitting the data into first portions. The computer program also includes outputting the first portions to the R interfaces based on data rates of the R interfaces when R>1. The computer program also includes reordering second portions of data received from the R interfaces in an order transmitted by the M interfaces.

In other features, the computer program includes storing the second portions for communicating the second portions to the devices. The computer program also includes adding sequence identifiers to portions of data transmitted by the M interfaces when M>1. The computer program also includes reordering the portions received by the R interfaces based on the sequence identifiers.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
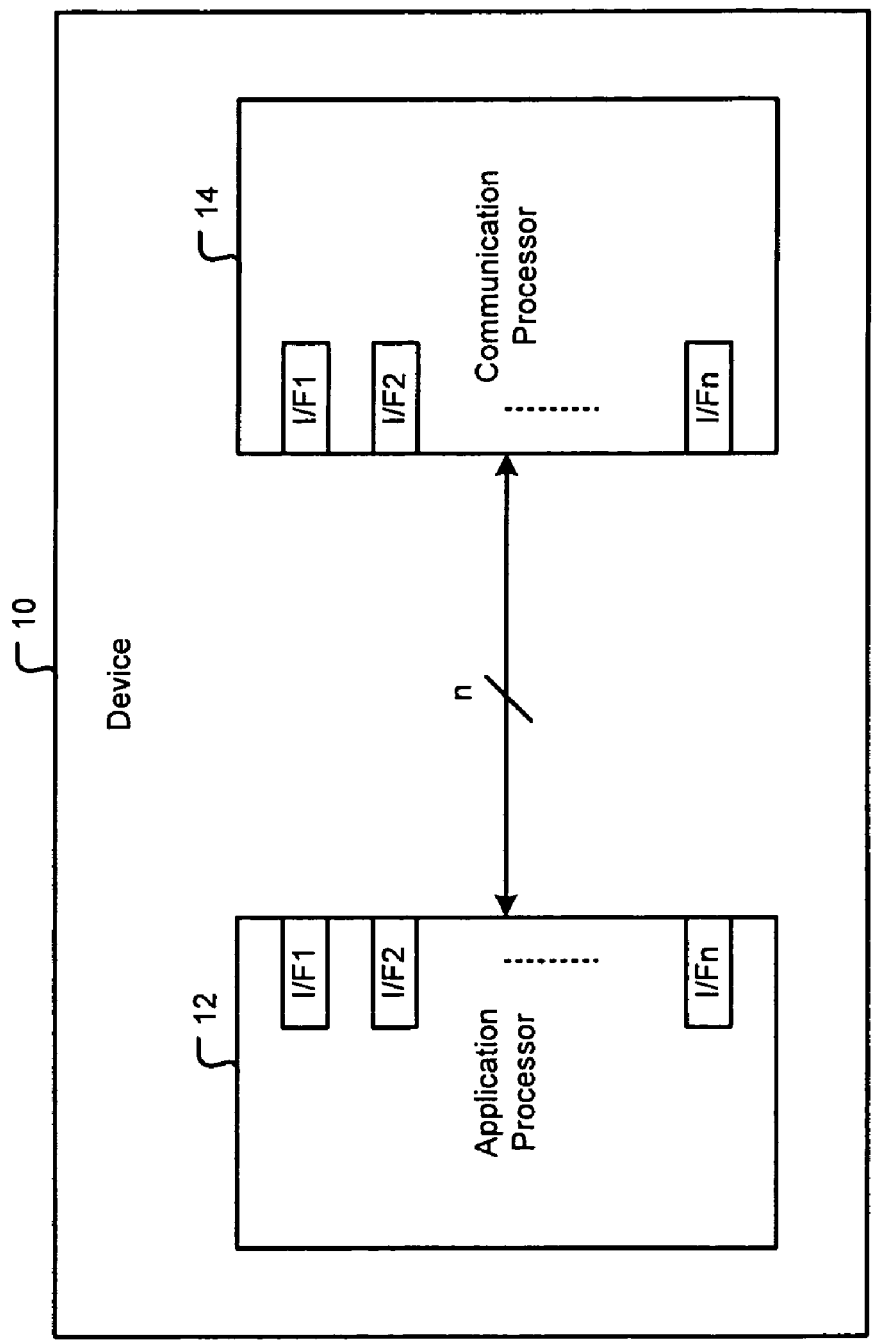
FIG. 1 is a functional block diagram of an exemplary electronic data processing device.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In recent years, use of wireless networks, mobile network devices, and applications that can be executed over wireless networks has proliferated. Accordingly, optimizing use of available bandwidth and conserving power consumed by the mobile devices are becoming increasingly important considerations when designing and utilizing mobile devices.

Generally, mobile devices utilize a preset bandwidth when executing applications regardless of the complexity of the applications. Some applications, however, may not need the entire preset bandwidth. For example, while multimedia applications may utilize maximum available bandwidth, less than the preset bandwidth may suffice to execute email programs. Accordingly, the efficiency with which the mobile devices use the available bandwidth can be increased by allocating bandwidth based on the applications executed.

Additionally, power consumed by the mobile devices can be decreased by selecting hardware interfaces that provide sufficient bandwidth to exchange data between application and communication processors when executing a given application. Hardware interfaces may differ in terms of data, power and initialization requirements. Thus, using hardware interfaces that provide high data rates for applications that do not require high data rates may waste power. Accordingly, using an optimized interface based on an application request may minimize power consumption due to application efficiency requirements. When applications do not require high data rates, the hardware interfaces that provide high data rates may be turned off, and the hardware interfaces that provide low data rates may be used instead to save power. Additionally, one or more hardware interfaces can be used in combination to provide increased bandwidth when applications demand high bandwidth.

Figure 2:
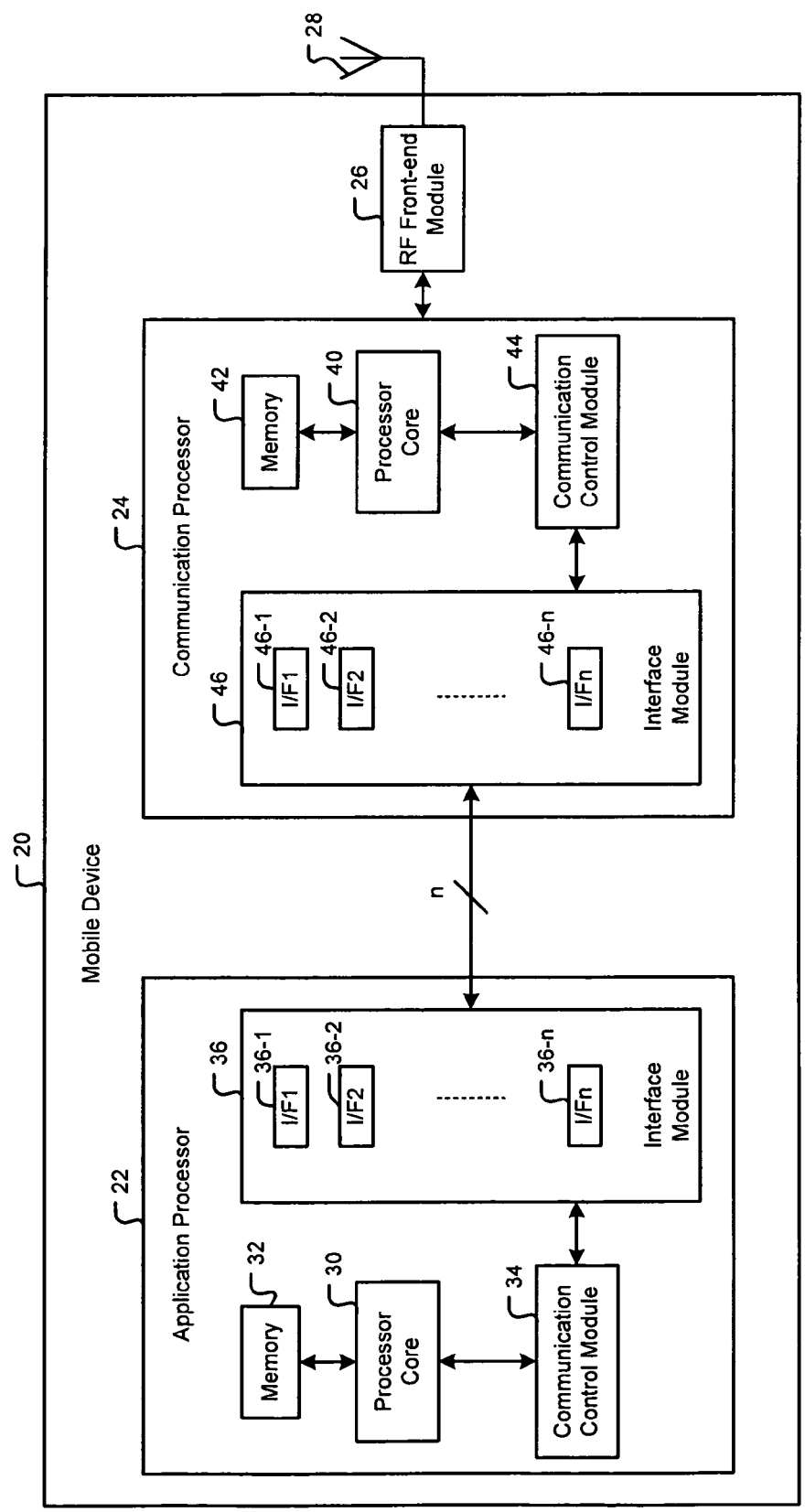
FIG. 2 is a functional block diagram of an exemplary mobile network device according to the present disclosure.
Figure 3A:
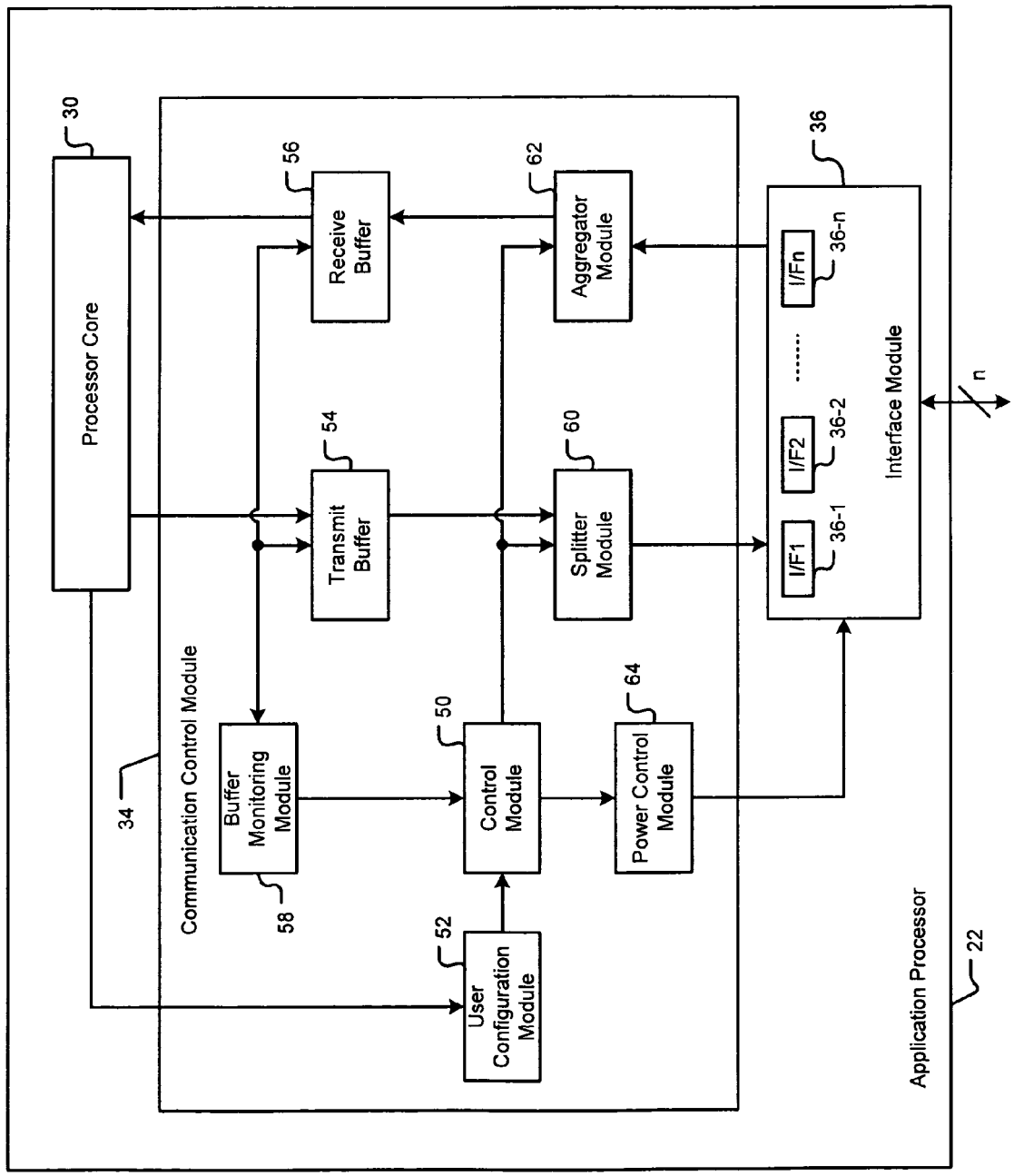
FIGS. 3A and 3B are functional block diagrams of exemplary communication control modules (CCMs) according to the present disclosure.
Figure 3B:
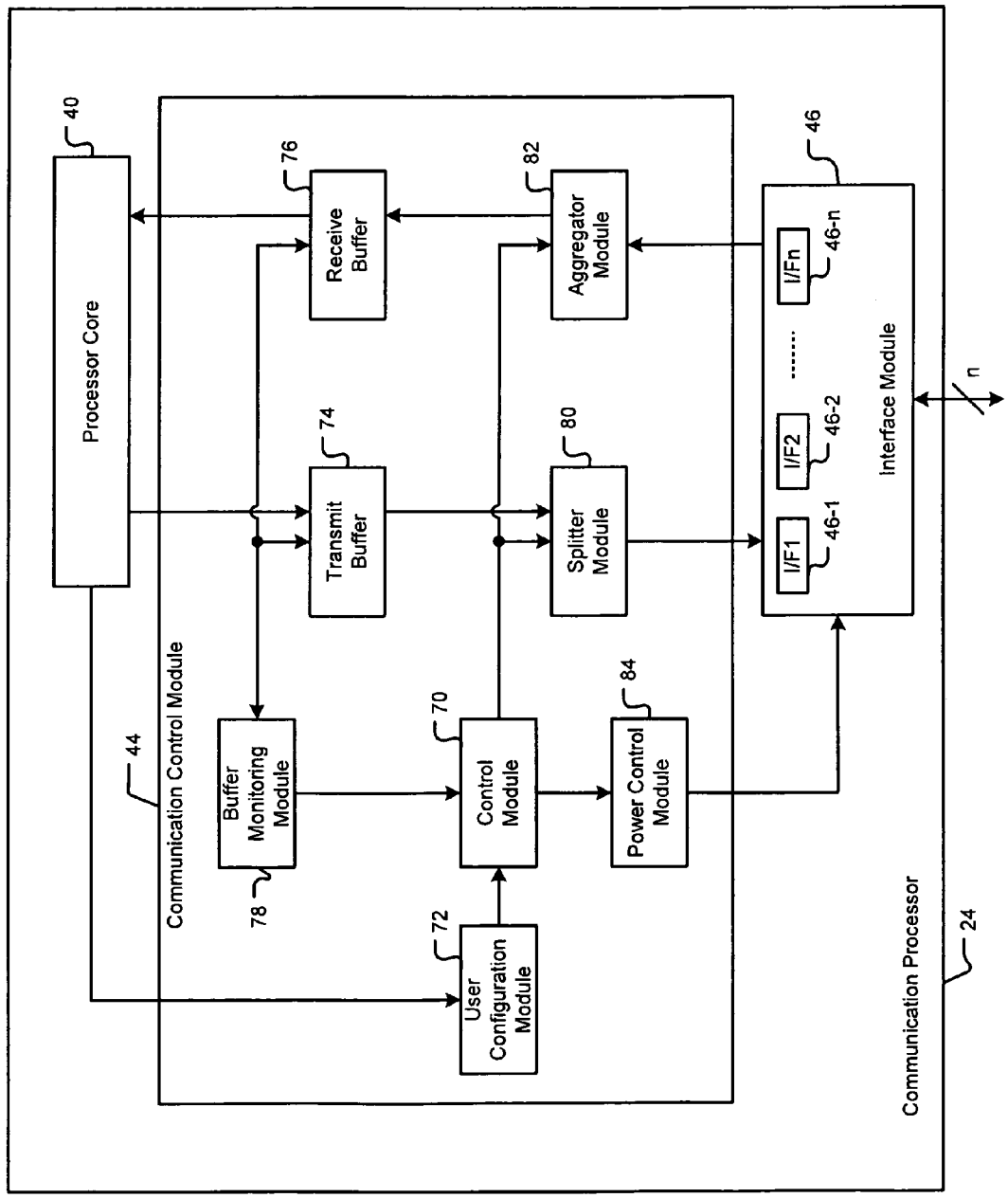
Figure 4:
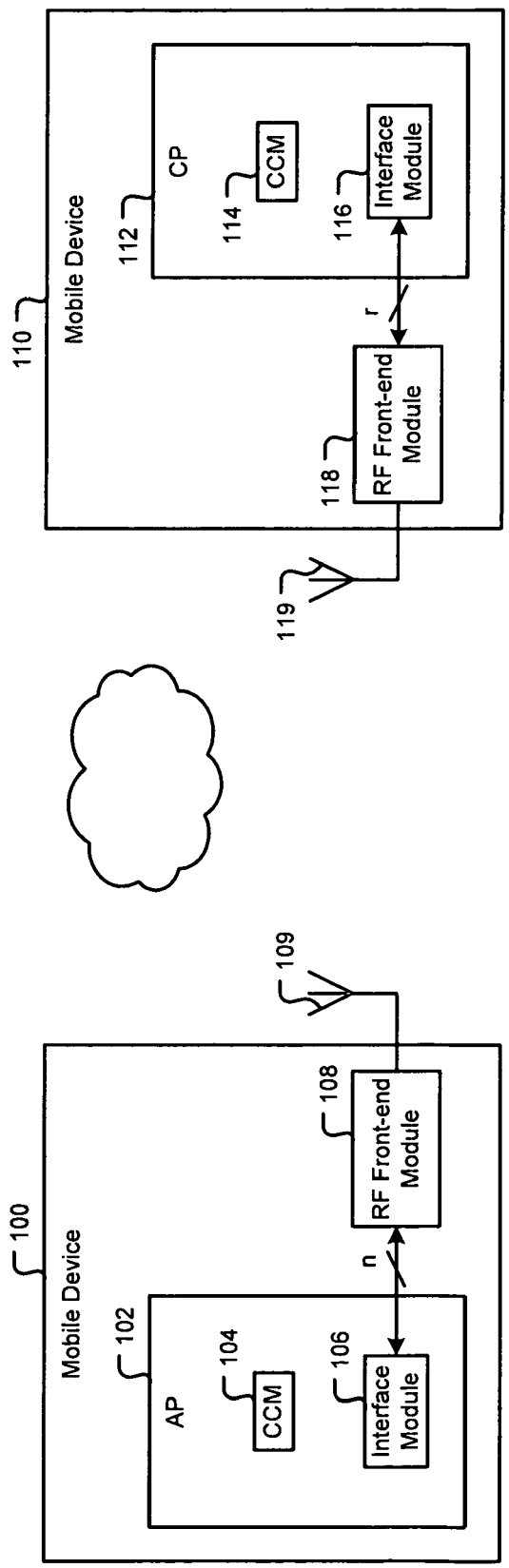
FIG. 4 is a functional block diagram of exemplary mobile devices according to the present disclosure.
Figure 5:
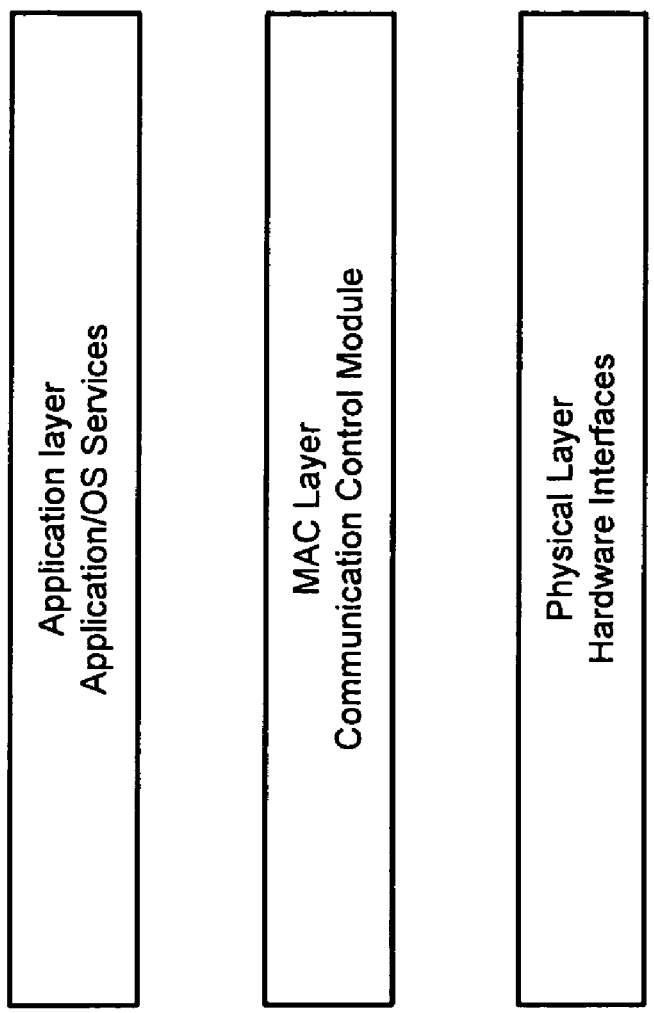
FIG. 5 depicts a CCM implemented in a medium access (MAC) layer according to the present disclosure.
Figure 6:
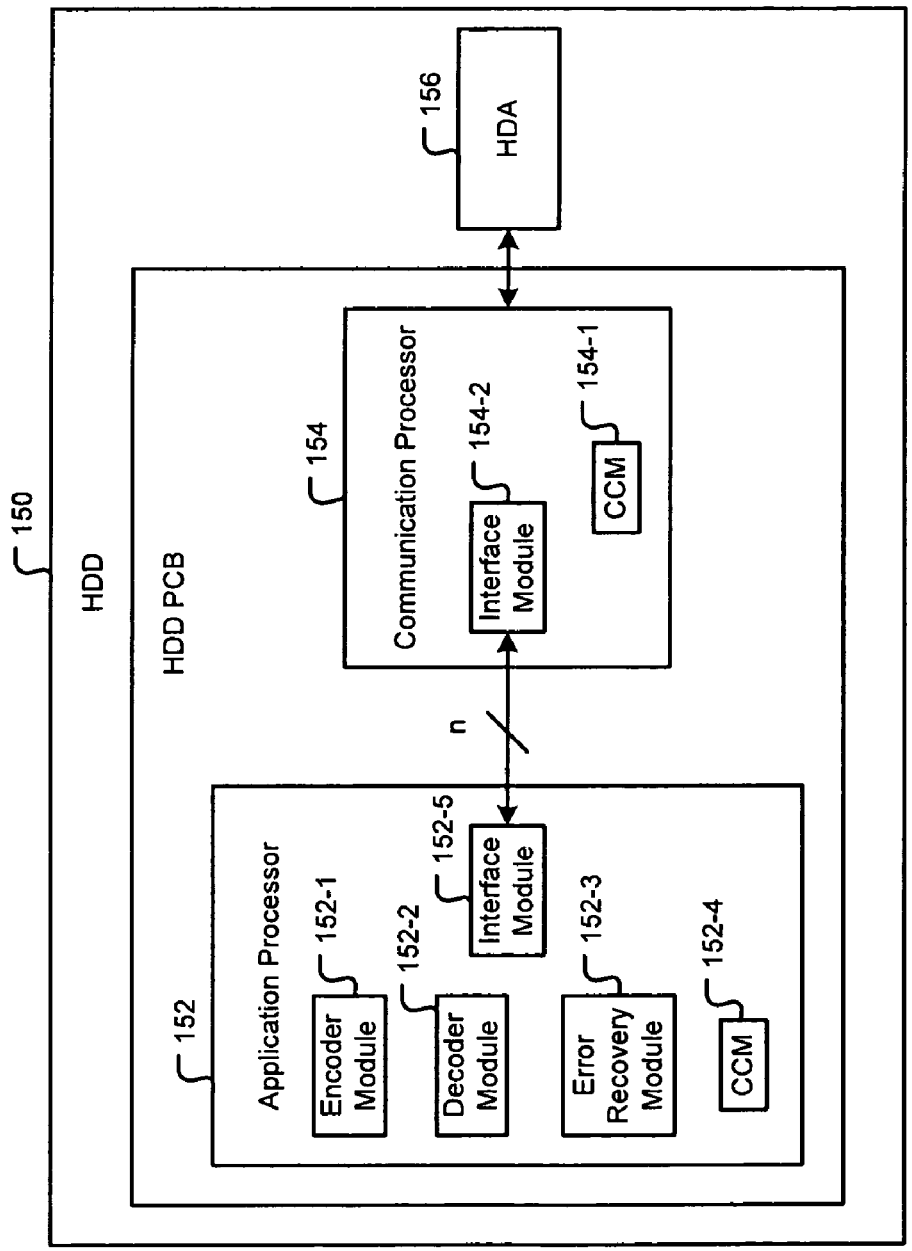
FIG. 6 is a functional block diagram of an exemplary hard disk drive (HDD) according to the present disclosure.
Figure 7:
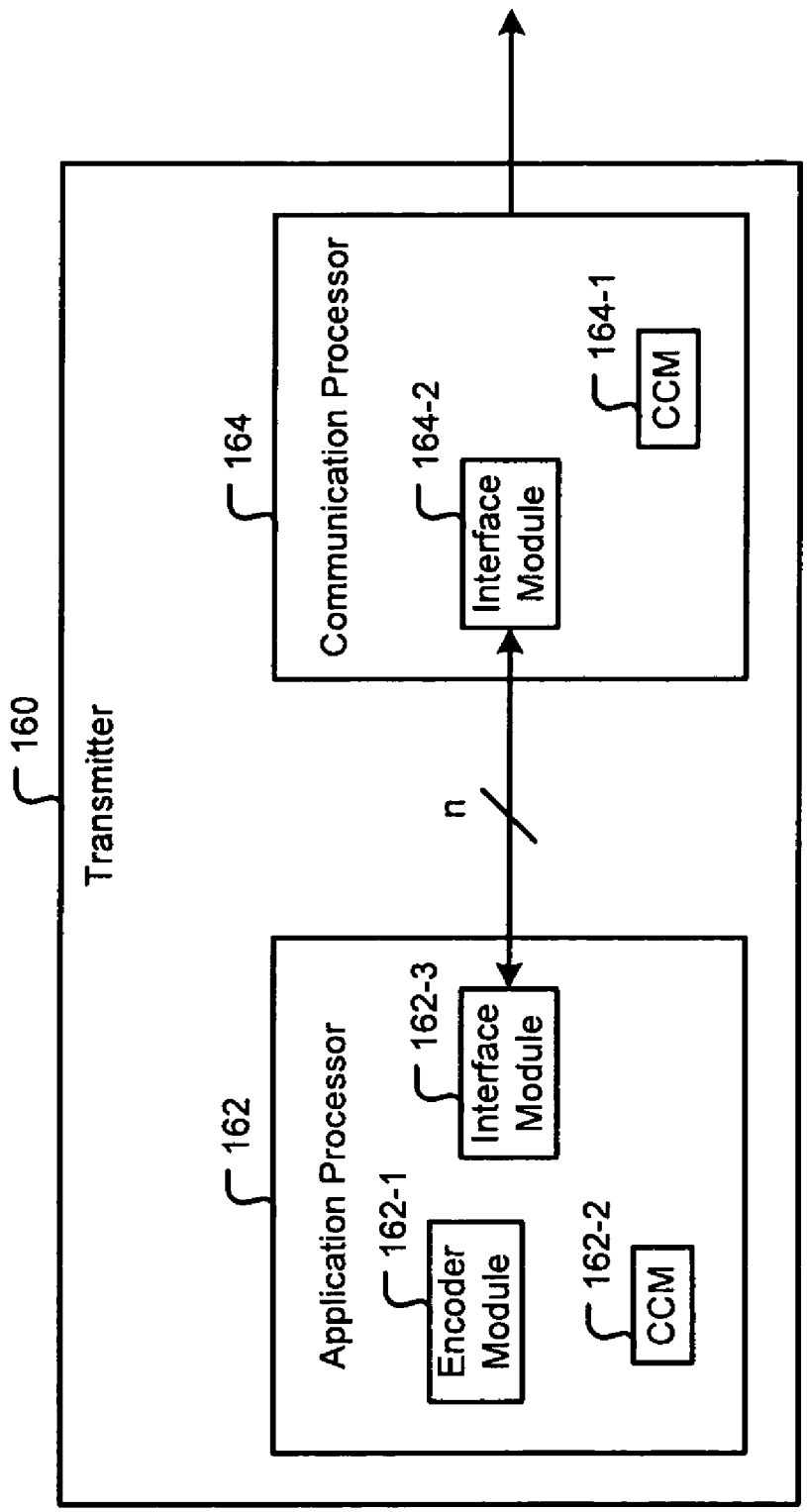
FIG. 7 is a functional block diagram of an exemplary transmitter according to the present disclosure.
Figure 8:
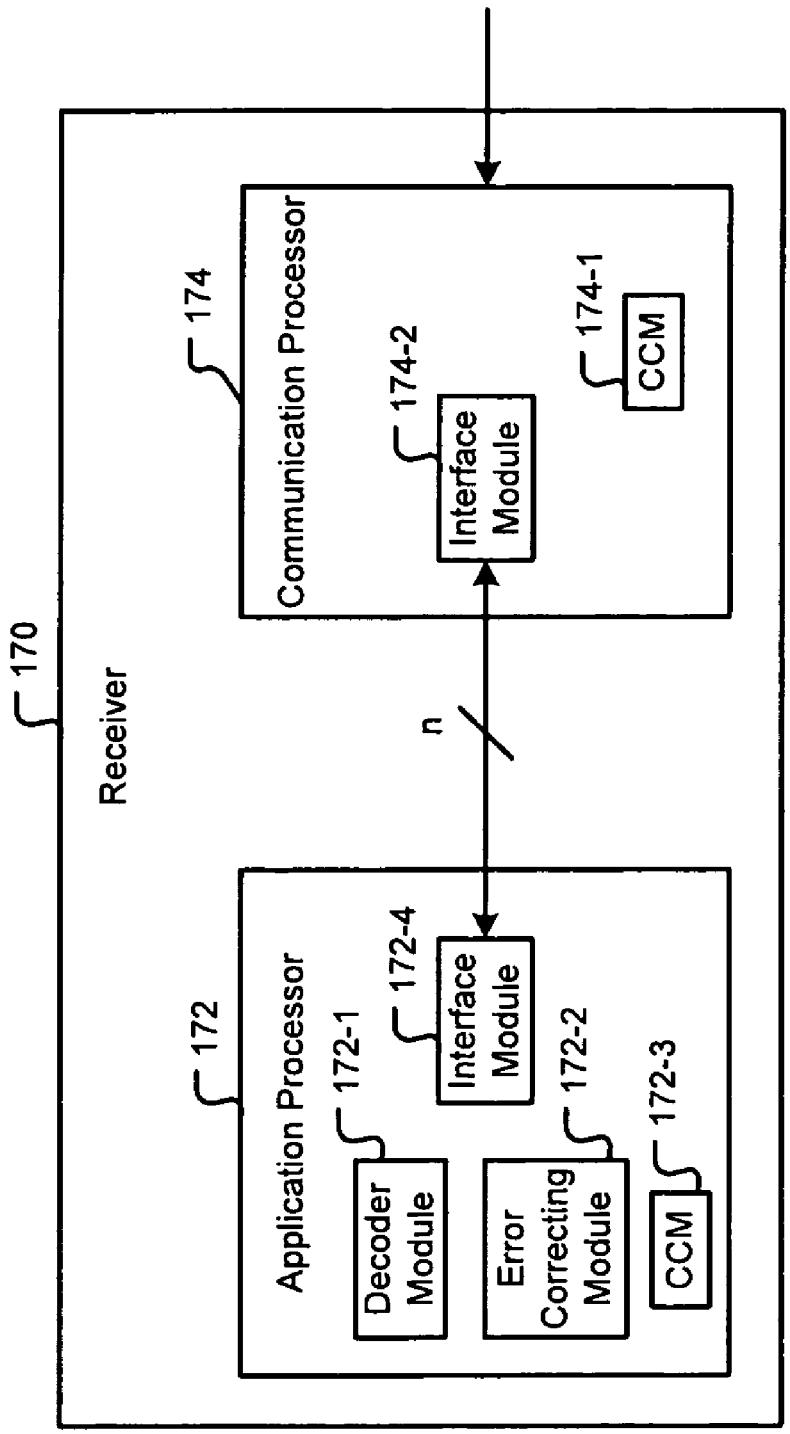
FIG. 8 is a functional block diagram of an exemplary receiver according to the present disclosure.
Figure 9:
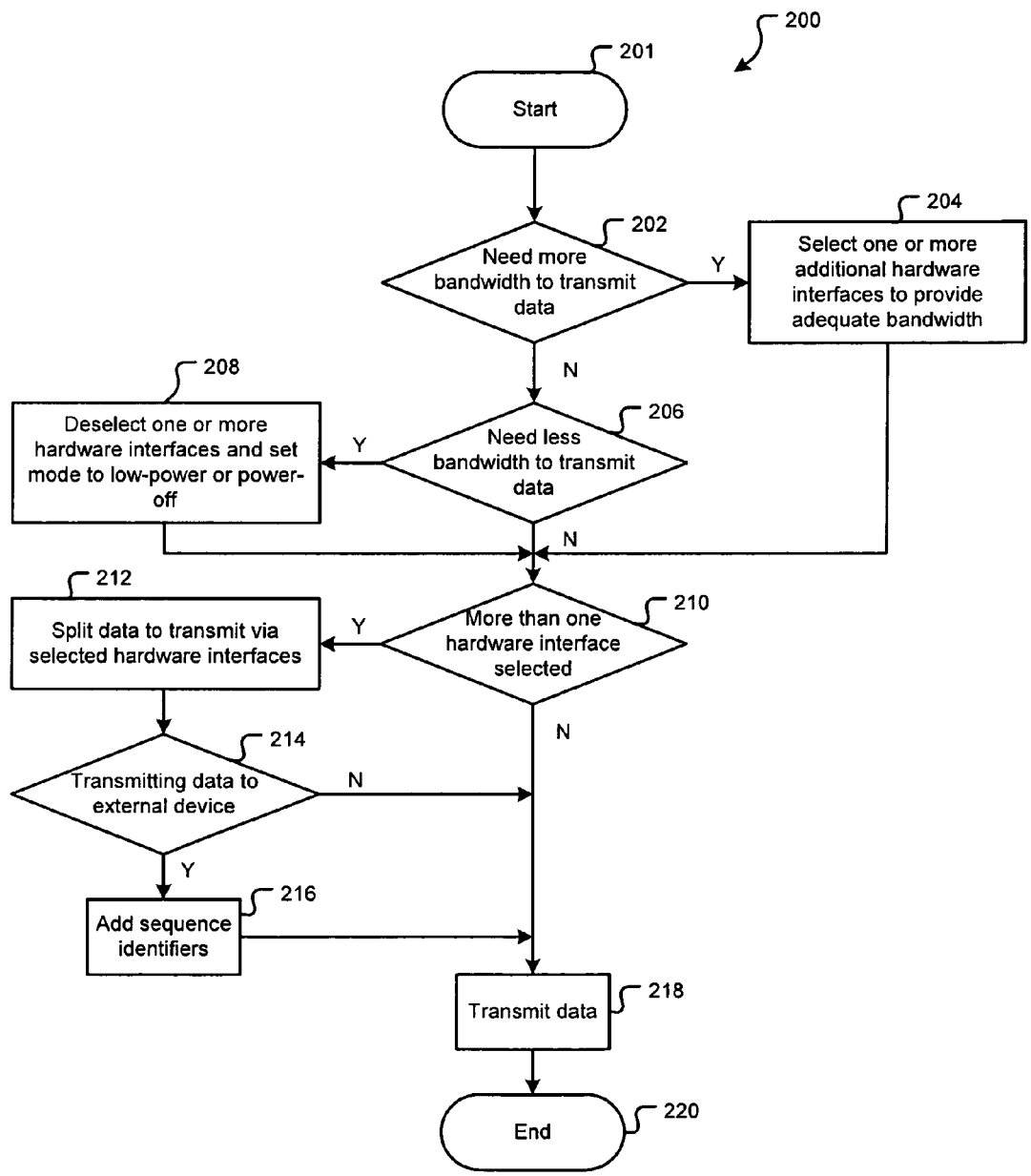
FIG. 9 is a flowchart of an exemplary method for optimizing bandwidth and power when a device transmits data according to the present disclosure.
Figure 10:
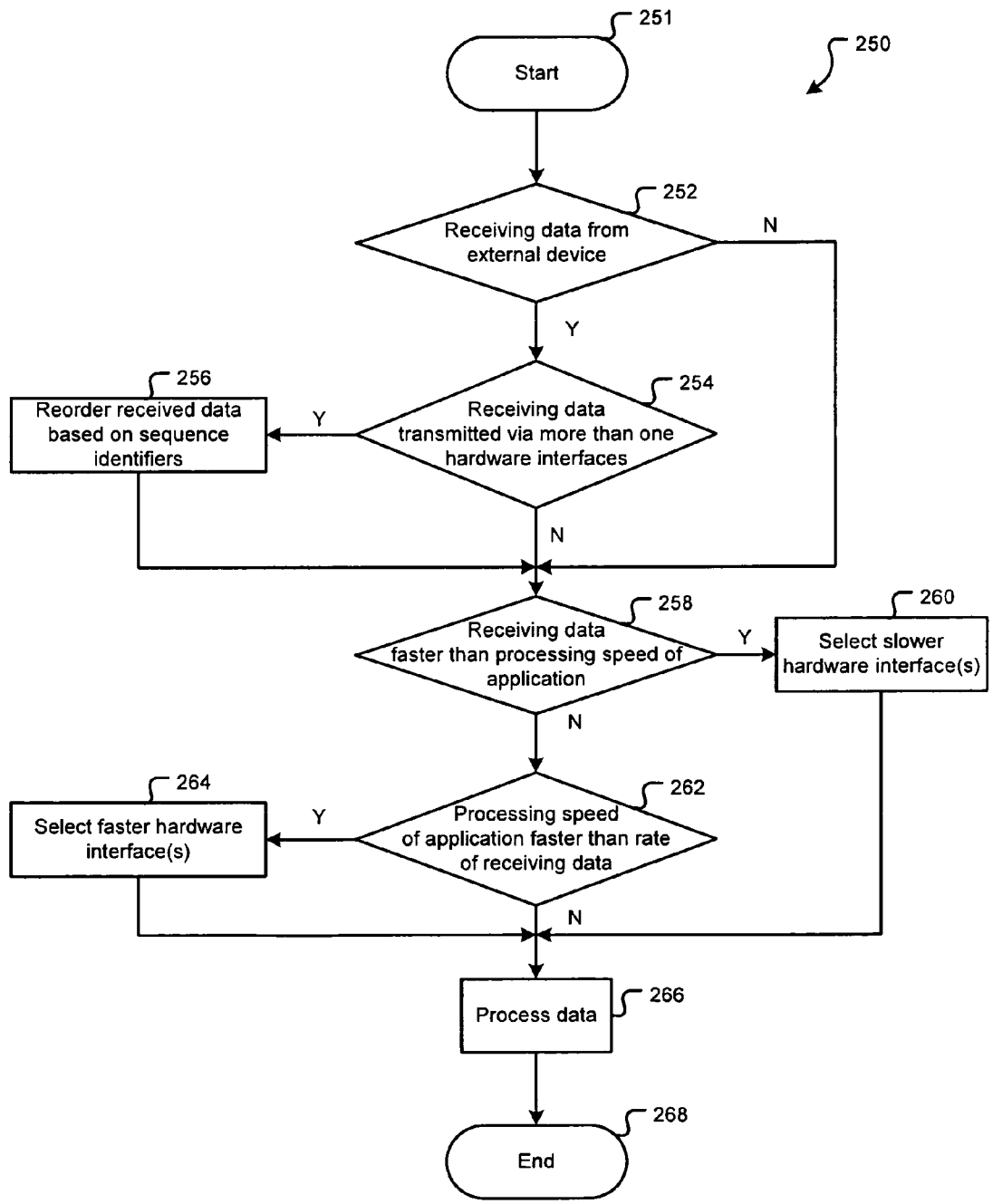
FIG. 10 is a flowchart of an exemplary method for optimizing bandwidth and power when a device receives data according to the present disclosure.

Before a detailed discussion is presented, a brief description of drawings is presented. FIG. 2 shows an exemplary mobile device that utilizes communication control modules (CCMs) in application processors and communication processors to optimize bandwidth and power consumption of the mobile device. FIGS. 3A and 3B show the CCMs of the application processors and communication processors in detail. FIG. 4 shows an application processor of one mobile device having a CCM that communicates with a communication processor of another mobile device having a CCM. FIG. 5 shows that the CCMs may be implemented in medium access control (MAC) layers of communication devices. FIGS. 6-8 show other exemplary devices that may utilize the CCMs to optimize bandwidth and power consumption. FIGS. 9 and 10 show flowcharts of methods for optimizing bandwidth and power consumption using CCMs when transmitting and receiving data, respectively.

Referring now to FIG. 2, a mobile device 20 that optimizes bandwidth use and power consumption is shown. The mobile device 20 comprises an application processor (AP) 22, a communication processor (CP) 24, a radio frequency (RF) front-end module 26, and an antenna 28. The AP 22 executes applications. The CP 24 communicates with the AP 22, transmits data received from the AP 22 to other devices, and provides data received from other devices to the AP 22. The CP 24 transmits and receives data to and from other devices via the RF front-end module 26 and the antenna 28.

The AP 22 comprises a processor core 30, memory 32, a communication control module (CCM) 34, and an interface module 36 that includes hardware interfaces I/F1 36-1, I/F2 36-2, ..., and I/Fn 36-n, where n is an integer greater than 1. The processor core 30 and memory 32 execute applications. The CCM 34 controls communication of the AP 22 with the CP 24 when the processor core 30 executes applications. Depending on the application executed, the CCM 34 allocates bandwidth for communicating with the CP 24. The CCM 34 allocates the bandwidth by aggregating one or more of the hardware interfaces I/F1 36-1, I/F2 36-2, ..., and I/Fn 36-n.

The hardware interfaces I/F1 36-1, I/F2 36-2, ..., and I/Fn 36-n may have three modes of operation: a full-power mode, a low-power mode, which may include a power-save mode, and a power-off mode. The hardware interfaces I/F1 36-1, I/F2 36-2, ..., and I/Fn 36-n operate in full-power mode when transmitting and receiving data. The hardware interfaces I/F1 36-1, I/F2 36-2, ..., and I/Fn 36-n may operate in the low-power mode when not transmitting and receiving data. Alternatively, the hardware interfaces I/F1 36-1, I/F2 36-2, ..., and I/Fn 36-n may operate in the power-off mode where the power to the hardware interfaces I/F1 36-1, I/F2 36-2, ..., and I/Fn 36-n is turned off when not transmitting and receiving data.

Depending on the bandwidth requirement of the application, the CCM 34 may save power by deselecting one or more of the hardware interfaces I/F1 36-1, I/F2 36-2, ..., and I/Fn 36-n. The deselected hardware interfaces may be turned off or switched to the low-power mode.

The CP 24 comprises a processor core 40, memory 42, a CCM 44, and an interface module 46 that includes hardware interfaces I/F1 46-1, I/F2 46-2, ..., and I/Fn 46-n. The processor core 40 and memory 42 execute communication programs for communicating with the AP 22 and the RF front-end module 26. The CCM 44 controls communication of the CP 24 with the AP 22. Depending on the application executed by the AP 22, the CCM 44 allocates bandwidth for communicating with the AP 22. The CCM 44 allocates the bandwidth by aggregating the hardware interfaces I/F1 46-1, I/F2 46-2, ..., and I/Fn 46-n.

The hardware interfaces I/F1 46-1, I/F2 46-2, ..., and I/Fn 46-n may have three modes of operation: the full-power mode, the low-power mode, and the power-off mode. The hardware interfaces I/F1 46-1, I/F2 46-2, ..., and I/Fn 46-n operate in full-power mode when transmitting and receiving data. The hardware interfaces I/F1 46-1, I/F2 46-2, ..., and I/Fn 46-n may operate in the low-power mode when not transmitting and receiving data. Alternatively, the hardware interfaces I/F1 46-1, I/F2 46-2, ..., and I/Fn 46-n may operate in the power-off mode where the power to the hardware interfaces I/F1 46-1, I/F2 46-2, ..., and I/Fn 46-n is turned off when not transmitting and receiving data. The CCM 44 may select the power-off mode when any or all of the hardware interfaces I/F1 46-1, I/F2 46-2, ..., and I/Fn 46-n will be inactive for an amount of time exceeding a predetermined threshold.

Depending on the bandwidth requirement of the application, the CCM 44 may save power by deselecting one or more of the hardware interfaces I/F1 46-1, I/F2 46-2, ..., and I/Fn 46-n. The deselected hardware interfaces may be turned off or switched to the low-power mode.

Referring now to FIGS. 3A and 3B, the CCM 34 of the AP 22 and the CCM 44 of the CP 24 are shown. In FIG. 3A, the CCM 34 comprises a control module 50, a user configuration module 52, a transmit buffer 54, a receive buffer 56, a buffer monitoring module 58, a splitter module 60, an aggregator module 62, and a power control module 64. The transmit buffer 54 and the receive buffer 56 may include circular buffers. The user configuration module 52 may receive a user configuration from the processor core 30 when the mobile device 20 initializes. The user configuration may comprise default settings including bandwidth and hardware interface selection for the AP 22. The bandwidth setting of the AP 22 determines the data rate at which the AP 22 can communicate with the CP 24. The control module 50 may initialize the bandwidth and hardware interface settings of the AP 22 based on the user configuration.

In FIG. 3B, the CCM 44 comprises a control module 70, a user configuration module 72, a transmit buffer 74, a receive buffer 76, a buffer monitoring module 78, a splitter module 80, an aggregator module 82, and a power control module 84. The transmit buffer 74 and the receive buffer 76 may include circular buffers. The user configuration module 72 may receive a user configuration from the processor core 40 when the mobile device 20 initializes. The user configuration may comprise default settings including bandwidth and hardware interface selection for the CP 24. The bandwidth setting of the CP 24 determines the data rates at which the CP 24 can communicate with the AP 22. The control module 70 may initialize the bandwidth and hardware interface settings of the CP 24 based on the user configuration or preference.

Initially, bandwidth and power optimization by the CCM 34 when the AP 22 transmits and receives data to and from the CP 24 is described. Subsequently, bandwidth and power optimization by the CCM 44 when the CP 24 transmits and receives data to and from the AP 22 is described.

In use, when the AP 22 executes an application, the AP 22 may transmit data to the CP 24. The CP 24 may transmit the data to other devices via the RF front-end module 26 and the antenna 28. The transmit buffer 54 may receive data generated by the application from the processor core 30. The control module 50 may select one or more hardware interfaces of the interface module 36 to transmit the data to the CP 24. The control module 50 may select the hardware interfaces based on the bandwidth demand of the application and the bandwidth capability of the CP 24 to transmit data to other devices.

For example, the CP 24 may be able to transmit data to other devices at 27 MHz. The default hardware interface of the AP 22 may, however, provide a data rate of only 20 MHz. If the application demands a bandwidth greater than 20 MHz, the control module 50 may select an additional hardware interface of the interface module 36 having a data rate of 20 MHz. The default and the additional hardware interfaces together may provide a total bandwidth of 40 MHz between the AP 22 and the CP 24. Since the AP 22 can transmit the data to the CP 24 at data rates greater than 20 MHz, the CP 24 can maintain the data rate of 27 MHz when transmitting the data to other devices.

Alternatively, the bandwidth demand of another application executed by the AP 22 may be 6 MHz. The control module 50 may select hardware interfaces I/F1 36-1 and I/F2 36-2, for example, that can provide data rates of 1 MHz and 5 MHz, respectively. The splitter module 60 may split blocks of data received from the transmit buffer 54. The splitter module 60 may forward a first block to the hardware interface I/F1 36-1, next five blocks to the hardware interface I/F2 36-2, and so on. The hardware interfaces I/F1 36-1 and I/F2 36-2 may transmit the blocks received from the splitter module 60 at 1 MHz and 5 MHz to the CP 24, respectively. The hardware interfaces I/F1 36-1 and I/F2 36-2 together may transmit the blocks from the AP 22 to the CP 24 at a combined data rate of 6 MHz.

Occasionally, applications may generate data faster than the rate at which the AP 22 transmits the data to the CP 24. The buffer monitoring module 58 of the AP 22 may monitor the amount of data stored in the transmit buffer 54. The user configuration stored in the CCM 34 may set first and second predetermined thresholds for monitoring the amount of data stored in the transmit buffer 54. The control module 50 may dynamically alter the first and second thresholds.

The buffer monitoring module 58 may generate a first control signal when the amount of data accumulated in the transmit buffer 54 is greater than or equal to the first predetermined threshold. For example, the buffer monitoring module 58 may generate the first control signal when the transmit buffer 54 is J % full, where J is an integer and $1<J<100$. On receiving the first control signal, the control module 50 may alter the combination of the hardware interfaces used to transmit data to the CP 24. For example, the control module 50 may deselect the hardware interface I/F1 36-1 and select the hardware interface I/Fn 36-n that may have a data rate of 5 MHz. Thus, the hardware interfaces I/F2 36-2 and I/Fn 36-n may provide a total data rate of 10 MHz that is greater than the data rate of 6 MHz demanded by the application.

The buffer monitoring module 58 may generate a second control signal when the amount of data in the transmit buffer 54 decreases to a value less than or equal to a second predetermined threshold. For example, the transmit buffer 54 may be K % full, where K is an integer and $1<K<J$. On receiving the second control signal, the control module 50 may alter the combination of the hardware interfaces used to transmit the data. For example, the control module 50 may deselect the hardware interfaces I/F2 36-2 and I/Fn 36-n and reselect the hardware interface I/F1 36-1 if the data rate of the hardware interface I/F1 36-1 is sufficient to transmit the data from the AP 22 to the CP 24.

Thus, when the AP 22 transmits data to the CP 24, the control module 50 may select and deselect one or more hardware interfaces I/F1 36-1, I/F2 36-2, . . . , and I/Fn 36-n to transmit data to the CP 24 based on the following factors: the amount of data in the transmit buffer 54, the data rates of the hardware interfaces of the interface module 36, and the data rate at which the CP 24 can transmit data to other devices and an overall power consumption model that may be configured by the user. The control module 50 may generate control signals when the control module 50 selects and deselects one or more hardware interfaces of the interface module 36. On receiving the control signals, the power control module 64 may turn the selected and deselected hardware interfaces on and off, respectively. Alternatively, the deselected hardware interfaces may be switched to the low-power mode. By actively monitoring the transmit buffer 54 and by dynamically switching the hardware interfaces of the interface module 36, the control module 50 can provide adequate bandwidth and power savings.

Additionally, buffering data in the transmit buffer 54 can help maintain the rate of data transmission from the CP 24 to other devices although the application executed by the AP 22 may generate data at variable rates. Occasionally, the control module 50 may use handshake signals or codes to control the data flow between the AP 22 and the CP 24. The handshake signals or codes may depend on the type of hardware interfaces used to implement the hardware interfaces I/F1 36-1, I/F2 36-2, . . . , and I/Fn 36-n.

When the AP 22 receives data from the CP 24, the interface module 36 may receive data via more than one hardware interface if the splitter module 80 of the CP 24 splits and transmits the data to the AP 22 via more than one hardware interface. The aggregator module 62 automatically receives the data in the order in which the splitter module 80 of the CP 24 splits and transmits the data. For example, the aggregator module 62 may receive first P1 blocks from I/F1 36-1 and next P2 blocks from I/F2 36-2 if the splitter module 80 transmitted P1 and P2 blocks via I/F1 46-1 and I/F2 46-2, respectively. The aggregator module 62 outputs the P1 blocks followed by the P2 blocks to the receive buffer 56. The receive buffer 56 stores the data and outputs the data to the application executed by the processor core 30.

Occasionally, the AP 22 may receive data at a faster rate than the rate at which the application can process the received data. The buffer monitoring module 58 may detect when the data buffered in the receive buffer 56 is being received at a faster rate than the rate at which the application can process the received data. The buffer monitoring module 58 may generate a control signal when the receive buffer 56 is J % full. Based on the control signal, the control module 50 may select a hardware interface or a combination of hardware interfaces of the interface module 36 that provides a slower data rate than the data rate provided by the hardware interface or interfaces in use. Once the receive buffer 56 is K % full, the buffer monitoring module 58 may generate another control signal based on which the control module 50 may revert to using the prior hardware interface or interfaces.

Thus, when the AP 22 receives data from the CP 24, the control module 50 may select and deselect hardware interfaces of the interface module 36 based on the following factors: the amount of data in the receive buffer 56, the rate at which data is processed by the application, and the data rates of the hardware interfaces I/F1 36-1, I/F2 36-2, . . . , and I/Fn 36-n. By actively monitoring the data in the receive buffer 56 and by dynamically switching the hardware interfaces of the interface module 36, the control module 50 can provide adequate bandwidth and power savings.

When the CP 24 transmits data to the AP 22, the processor core 40 may process the data received from the RF front-end module 26 and may input the data to the transmit buffer 74. Based on the rate at which the CP 24 receives data from the RF front-end module 26, the control module 70 may select one or more hardware interfaces I/F1 46-1, I/F2 46-2, ..., and I/Fn 46-n to transmit the data to the AP 22. Based on the number and data rate of the hardware interfaces selected, the splitter module 80 may split the blocks of data and transmit the blocks to the AP 22 via the selected hardware interfaces. The buffer monitoring module 78 may monitor when the transmit buffer 74 gets J % or K % full and may generate control signals in the same manner as does the buffer monitoring module 58 of the AP 22 when the AP 22 transmits data to the CP 24. Based on the control signals, the control module 70 may select and deselect one or more hardware interfaces of the interface module 46 in the same manner as does the control module 50 of the AP 22.

Thus, when the CP 24 transmits data to the AP 22, the control module 70 may select and deselect one or more hardware interfaces of the interface module 46 based on the following factors: the rate at which the CP 24 receives data from the RF front-end module 26, the amount of data in the transmit buffer 54, and the data rates of the hardware interfaces of the interface module 46. The control module 70 may generate control signals when the control module 70 selects or deselects one or more hardware interfaces of the interface module 46. On receiving the control signals, the power control module 84 may turn the selected and deselected hardware interfaces on and off, respectively. Alternatively, the deselected hardware interfaces may be switched to the low-power mode. Thus, by actively monitoring the transmit buffer 74 and by dynamically switching the hardware interfaces of the interface module 46, the control module 70 can provide adequate bandwidth and power savings.

Additionally, buffering data in transmit and receive buffers 74, 76 can help maintain the rate of data transfer between the CP 24 and other devices. Occasionally, the control module 70 may use handshake signals or codes to control the data flow between the CP 24 and the AP 22. The handshake signals or codes may depend on the type of hardware interfaces used to implement the hardware interfaces I/F1 46-1, I/F2 46-2, ..., and I/Fn 46-n.

When the CP 24 receives data from the AP 22, the aggregator module 82 of the CP 24 may receive blocks of data transmitted by the interface module 36 of the AP 22. The interface module 46 may receive the blocks in the same order in which the blocks are split by the splitter module 60 and transmitted by the interface module 36. For example, the hardware interface I/F1 46-1 may receive first P1 blocks from the hardware interface I/F1 36-1, the hardware interface I/F2 46-2 may receive the next P2 blocks from the hardware interface I/F1 36-2, and so on. The aggregator module 82 may output the blocks to the receive buffer 76. The receive buffer 76 may store the blocks and forward the blocks to the processor core 40. The processor core 40 may process the blocks and output the data to the RF front-end module 26. The RF front-end module 26 may transmit the data to another device via the antenna 28.

The buffer monitoring module 78 may monitor the amount of data buffered in the receive buffer 76 and generate control signals when the receive buffer is P % or Q % full in the same manner as does the buffer monitoring module 58 of the AP 22. Based on the control signals, the control module 70 may select and deselect hardware interfaces of the interface module 46 in the same manner as the control module 50 selects and deselects hardware interfaces of the interface module 36.

Thus, when the CP 24 receives data from the AP 22, the control module 70 may select and deselect hardware interfaces of the interface module 46 based on the following factors: the rate at which the RF front-end module 26 can transmit data to other devices, the amount of data in the receive buffer 76, and the data rates of the hardware interfaces I/F1 46-1, I/F2 46-2, ..., and I/Fn 46-n. By actively monitoring the data in the receive buffer 76 and by dynamically switching the hardware interfaces of the interface module 46, the control module 70 can provide adequate bandwidth and power savings.

Referring now to FIG. 4, an AP of one mobile device may communicate with a CP of another mobile device. For example, a mobile device 100 may comprise an AP 102, a RF front-end module 108, and an antenna 109. The AP 102 may include a CCM 104 and an interface module 106 that has n hardware interfaces. A mobile device 110 may comprise a CP 112, a RF front-end module 118, and an antenna 119. The CP 112 may include a CCM 114 and an interface module 116 that may have r hardware interfaces, where r is an integer greater than 1, and in one embodiment r # n. In an alternative embodiment r may equal n.

In use, the AP 102 may transmit data to the CP 112 via one or more of the n hardware interfaces. When transmitting data via more than one of the n hardware interfaces, the splitter module of the CCM 104 may add sequence identifiers to the blocks that are transmitted via the selected hardware interfaces. When the CP 112 receives the data via one or more of the r interfaces, the aggregator module of the CCM 114 uses the sequence identifiers to reorder the data in the same order in which the AP 102 transmitted the data.

Referring now to FIG. 5, CCMs may be implemented in the medium access control (MAC) layer that is between the application layer and the physical layer. CCMs make applications independent of the hardware interfaces. CCMs can communicate with numerous standard interfaces including universal asynchronous receiver/transmitters (UARTs), universal synchronous bus (USB) interface, secure digital input/output (SDIO) interface, and/or serial peripheral interface (SPI). Additionally, the splitter and aggregator modules of the CCMs can be easily modified to communicate with any other interfaces that may be subsequently developed. Thus, newly developed hardware interfaces can be easily added to devices having CCMs.

Referring now to FIGS. 6-8, APs and CPs may be used to optimize bandwidth and power in many other devices that process and communicate large amounts of data. For example, APs and CPs may be used in mass storage devices including hard disk drives (HDDs) and optical drives (e.g., compact disc (CD) drives and digital versatile disc (DVD) drives. Additionally, the APs and CPs may be used in a variety of communication devices having transmitters and receivers (e.g., cellular phones). Use of APs and CPs in exemplary mass storage and communication devices is described below.

In FIG. 6, a HDD 150 may include an AP 152 and a CP 154. The AP 152 may include an encoder module 152-1, a decoder module 152-2, an error recovery module 152-3, a CCM 152-4, and an interface module 152-5 having n hardware interfaces. The CP 154 may include a CCM 154-1 and an interface module 154-2 having n hardware interfaces.

During write operations, the encoder module 152-1 may encode data. The AP 152 may transmit the encoded data to the CP 154 via one or more of the n hardware interfaces. The CP 154 may transmit the encoded data to a hard disk assembly (HDA) 156 of the HDD 150. During read operations, the CP 154 may receive streaming data from the HDA 156. The CP 154 may transmit the streaming data to the AP 152 via one or more of the n hardware interfaces. The decoder module 152-2 may decode the data. The error recovery module 152-3 may correct errors in the data. The CCMs 152-4 and 154-1 may optimize bandwidth and power consumed by the AP 152 and the CP 154 by aggregating the n hardware interfaces based on the applications executed by the AP 152.

In FIG. 7, a transmitter 160 of a communication device may include an AP 162 and a CP 164. The AP 162 may include an encoder module 162-1, a CCM 162-2, and an interface module 162-3 having n hardware interfaces. The CP 164 may include a CCM 164-1 and an interface module 164-2 having n hardware interfaces. The encoder module 162-1 may encode data that is to be transmitted. The AP 162 may transmit the encoded data to the CP 164 via one or more of the n hardware interfaces. The CP 164 may transmit the encoded data to other devices. The CCMs 162-2 and 164-1 may optimize the bandwidth between the AP 162 and the CP 164 and the power consumed by the AP 162 and the CP 164 by aggregating the n hardware interfaces.

In FIG. 8, a receiver 170 of a communication device may include an AP 172 and a CP 174. The AP 172 may include a decoder module 172-1, an error-correcting module 172-2, a CCM 172-3, and an interface module 172-4 having n hardware interfaces. The CP 174 may include a CCM 174-1 and an interface module 174-2 having n hardware interfaces. The CP 174 may receive encoded data from other devices. The CP 174 may transmit the received data to the AP 172 via one or more of the n hardware interfaces. The decoder module 172-1 may decode the data. The error-correcting module 172-2 may correct errors in the data. The CCMs 172-3 and 174-1 may optimize the bandwidth between the AP 172 and the CP 174 and the power consumed by the AP 172 and the CP 174 by aggregating the n hardware interfaces.

Referring now to FIG. 9, a method 200 for optimizing bandwidth and power when transmitting data using CCMs begins at step 201. The CCM determines in step 202 whether an application demands more than default bandwidth to transmit data. If the result of step 202 is true, the CCM selects one or more additional hardware interfaces to provide the additional bandwidth in step 204, and the method 200 goes to step 210. If the result of step 202 is false, the CCM determines in step 206 whether the application can transmit data using less than the default bandwidth. If the result of step 206 is true, the CCM deselects one or more hardware interfaces and sets mode of the hardware interfaces to the low-power or the power-off mode in step 208.

Thereafter, or if the result of step 206 is false, the CCM determines in step 210 whether more than one hardware interface is selected to transmit data. If the result of step 210 is true, the CCM splits the data in step 212 based on the number and the data rate of the selected hardware interfaces. The CCM determines in step 214 whether the data is to be transmitted to an external device. If the result of the step 214 is true, the CCM adds sequencing codes to the blocks of data transmitted via more than one hardware interface. Thereafter, or if the results of steps 210 or 214 are false, the CCM transmits the data via the selected hardware interface or interfaces in step 218. The method 200 ends in step 220.

Referring now to FIG. 10, a method 250 for optimizing bandwidth and power when receiving data using CCMs begins at step 251. The CCM determines in step 252 whether the data is being received from another (i.e., an external) device. If the result of step 252 is true, the CCM determines in step 254 whether the data being received is transmitted by the other device via multiple hardware interfaces. If the result of step 254 is true, the CCM reorders the received data based on the sequence identifiers in step 256.

Thereafter, or if the result of steps 252 or 254 is false, the CCM determines in step 258 whether the data is being received at a faster rate than the processing speed of the application. If the result of step 258 is true, the CCM selects hardware interface or interfaces that are slower than the hardware interface or interfaces in use in step 260, and the method 250 goes to step 266. If the result of step 258 is false, the CCM determines in step 262 whether the processing speed of the application is faster than the rate at which the data is being received. If the result of step 262 is true, the CCM selects hardware interface or interfaces that are faster than the hardware interface or interfaces in use in step 264. The application processes the data in step 266, and the method 250 ends in step 268.

Figure 11B:
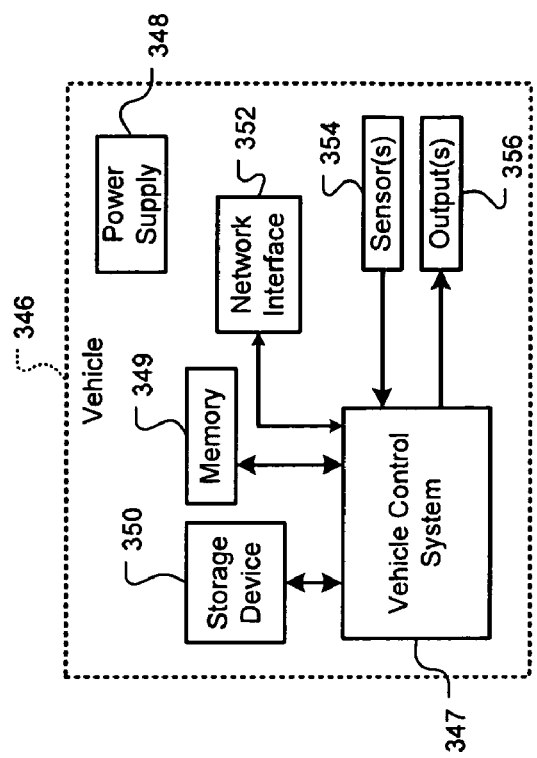
FIG. 11B is a functional block diagram of a vehicle control system.
Figure 11A:
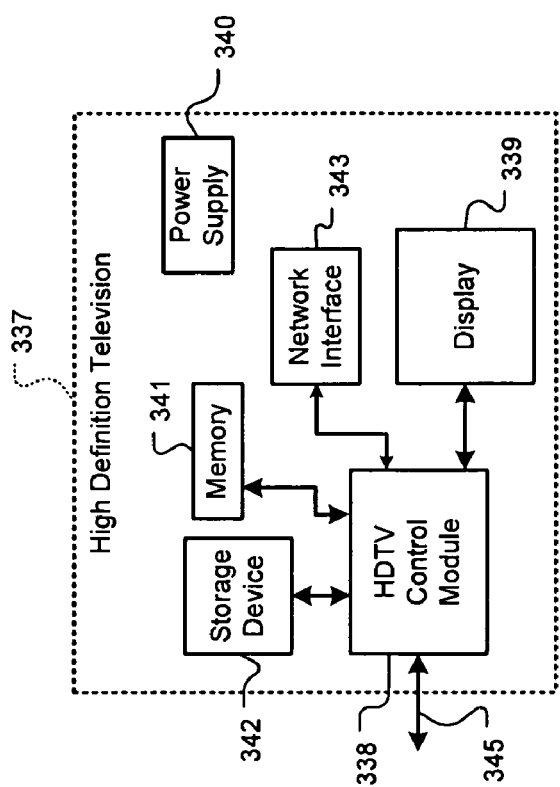
FIG. 11A is a functional block diagram of a high definition television.

Referring now to FIGS. 11A-11D, various exemplary implementations incorporating the teachings of the present disclosure are shown. Referring now to FIG. 11A, the teachings of the disclosure can be implemented in an HDTV control module 338 of a high definition television (HDTV) 337. The HDTV 337 includes the HDTV control module 338, a display 339, a power supply 340, memory 341, a storage device 342, a network interface 343, and an external interface 345. If the network interface 343 includes a wireless local area network interface, an antenna (not shown) may be included.

The HDTV 337 can receive input signals from the network interface 343 and/or the external interface 345, which can send and receive data via cable, broadband Internet, and/or satellite. The network or external interface 343, 345 may include multiple hardware interfaces controlled by the HDTV control module 338 in accordance with an embodiment of the present disclosure. The HDTV control module 338 may process the input signals, including encoding, decoding, filtering, and/or formatting, and generate output signals. The output signals may be communicated to one or more of the display 339, memory 341, the storage device 342, the network interface 343, and the external interface 345.

Memory 341 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 342 may include an optical storage drive, such as a DVD drive, and/or a hard disk drive (HDD). The HDTV control module 338 communicates externally via the network interface 343 and/or the external interface 345. The power supply 340 provides power to the components of the HDTV 337.

Referring now to FIG. 11B, the teachings of the disclosure may be implemented in a vehicle control system 347 of a vehicle 346. The vehicle 346 may include the vehicle control system 347, a power supply 348, memory 349, a storage device 350, and a network interface 352. If the network interface 352 includes a wireless local area network interface, an antenna (not shown) may be included. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 350 may include an optical storage drive, such as a DVD drive, and/or a hard disk drive (HDD). The vehicle control system 347 may communicate externally using the network interface 352. The network interface 352 may include multiple HD interfaces controlled by the vehicle control system 347 in accordance with an embodiment of the present disclosure, Referring now to FIG. 11C, the teachings of the disclosure can be implemented in a phone control module 360 of a cellular phone 358. The cellular phone 358 includes the phone control module 360, a power supply 362, memory 364, a storage device 366, and a cellular network interface 367. The cellular phone 358 may include a network interface 368, a microphone 370, an audio output 372 such as a speaker and/or output jack, a display 374, and a user input device 376 such as a keypad and/or pointing device. If the network interface 368 includes a wireless local area network interface, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, and the audio output 372. The cellular network interface 367 and the network interface 368 may include multiple HD interfaces controlled by the phone control module 360 in accordance with an embodiment of the present disclosure.

Memory 364 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 366 may include an optical storage drive, such as a DVD drive, and/or a hard disk drive (HDD). The power supply 362 provides power to the components of the cellular phone 358.

Figure 11D:
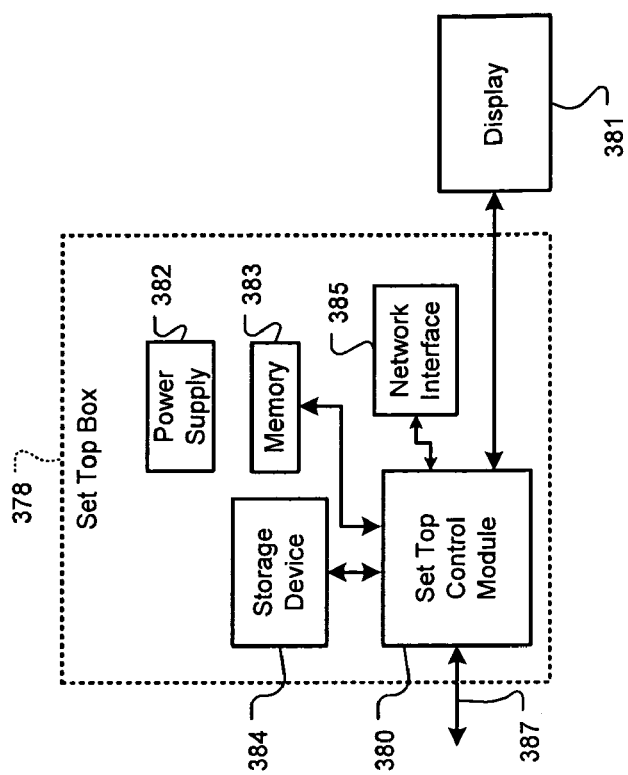
FIG. 11D is a functional block diagram of a set top box.
Figure 11C:
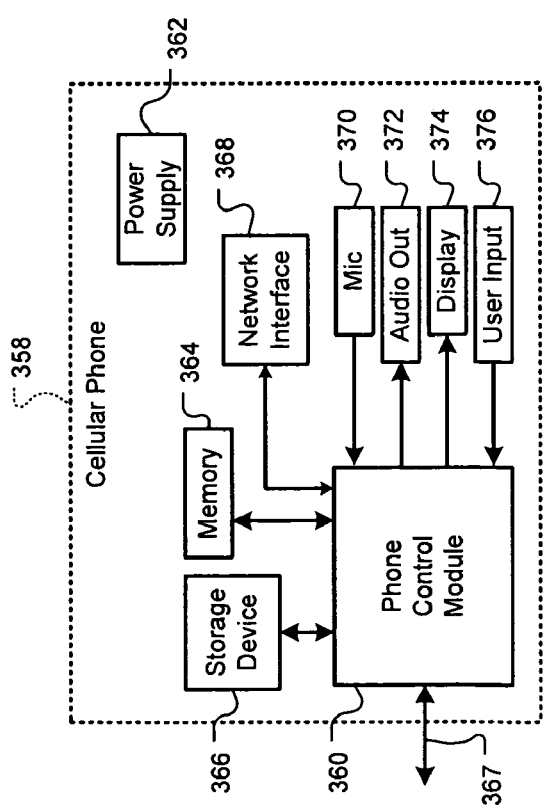
FIG. 11C is a functional block diagram of a cellular phone.

Referring now to FIG. 11D, the teachings of the disclosure can be implemented in a set top control module 380 of a set top box 378. The set top box 378 includes the set top control module 380, a display 381, a power supply 382, memory 383, a storage device 384, and a network interface 385. If the network interface 385 includes a wireless local area network interface, an antenna (not shown) may be included. The network interface 385 may include multiple HD interfaces controlled by the set top control module 380 in accordance with an embodiment of the present disclosure.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 384 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A first processor that executes an application, the first processor comprising:
   a first interface module that interfaces said first processor to a second processor, said first interface module including N interfaces, where N is an integer greater than 1; and
   a first communication control module (CCM) that is coupled to said first interface module and that selects M interfaces from said N interfaces based on bandwidth requested by said application to transmit data generated by said application to said second processor, where M is an integer and $1 \leq M \leq N$,
   wherein said first CCM comprises:
      a first transmit buffer that buffers first data generated by said application; and
      a first splitter module that receives said first data from said transmit buffer and outputs said first data to said M interfaces,
      wherein when M>1, said first splitter module splits said first data into first portions and outputs said first portions to said M interfaces based on data rates of said M interfaces.

2. The first processor of claim 1, wherein said first CCM sets interfaces other than said M interfaces to one of low-power and power-off modes.

3. A system comprising said first processor and said second processor of claim 1, wherein said second processor comprises:
   a second interface module that communicates with said first interface module and that includes P interfaces, where P is an integer greater than 1; and
   a second CCM that selects R interfaces from said P interfaces to transmit data to said first processor, where R is an integer and $1 \leq R \leq P$.

4. The system of claim 3, wherein said second CCM sets interfaces of said second interface module other than said R interfaces to one of low-power and power-off modes.

5. The system of claim 3, wherein said second CCM selects said R interfaces to transmit data to said first processor based on a rate at which said second processor receives data from devices other than said first processor.

6. The system of claim 3, wherein P=N.

7. The system of claim 3, wherein said first processor and said second processor are implemented by one of an integrated circuit (IC) and two separate devices.

8. The system of claim 3, wherein said N and P interfaces include at least one of universal asynchronous receiver/transmitters (UARTs), universal synchronous bus (USB) interfaces, secure digital input/output (SDIO) interfaces, and serial peripheral interfaces (SPIs).

9. The system of claim 3, wherein said first CCM further comprises:
   a first aggregator module that reorders second portions of data received from said M interfaces in an order transmitted by said R interfaces; and
   a first receive buffer that stores said second portions and that outputs said second portions to said application.

10. The system of claim 9, wherein said first splitter splits said data into a plurality of portions based on a number said M interfaces and said R interfaces that are active.

11. The system of claim 9, wherein said first CCM selects said M interfaces based on amounts of data in at least one of said first transmit buffer and said first receive buffer.

12. The system of claim 9, wherein said first transmit buffer and said first receive buffer are circular buffers.

13. The system of claim 3, wherein said second CCM comprises:
   a second transmit buffer that buffers second data received from devices other than said first processor; and
   a second splitter module that receives said second data from said second transmit buffer and outputs said second data to said R interfaces,
   wherein when R>1, said second splitter module splits said second data into second portions and that outputs said second portions to said R interfaces based on data rates of said R interfaces.

14. The system of claim 13, wherein said second CCM further comprises:
   a second aggregator module that reorders third portions of data received from said R interfaces in an order transmitted by said M interfaces; and
   a second receive buffer that stores said third portions for communicating said third portions to said devices.

15. The system of claim 14, wherein said second CCM selects said R interfaces based on amounts of data in at least one of said transmit buffer and said receive buffer.

16. The system of claim 14, wherein said second transmit buffer and said second receive buffer are circular buffers.

17. The system of claim 3, wherein said first processor is implemented by a first device, and wherein said second processor is implemented by a second device that is separate from said first device.

18. The system of claim 17, wherein said first CCM adds sequence identifiers to portions of data transmitted by said M interfaces when M>1, and wherein said second CCM reorders said portions received by said R interfaces based on said sequence identifiers.

19. A device comprising the system of claim 3, wherein said device includes one of a communication device, a mass storage device, a transmitter, and a receiver, wherein said communication device includes one of a mobile computing device, wireless network device, and a cellular phone, and wherein said mass storage device includes a hard disk drive (HDD), a compact disc (CD) drive, and a digital versatile disc (DVD) drive.

20. The first processor of claim 2, wherein said first CCM sets one of said low-power and power-off modes based on a predetermined amount of time that at least one interface of said N interfaces is not at least one of transmitting and receiving said first data.

21. The first processor of claim 1, wherein said first processor comprises an application processor (AP) and said second processor comprises a communication processor (CP).

22. A method for executing an application, the method comprising:
   interfacing a first processor to a second processor via N interfaces, where N is an integer greater than 1;
   selecting M interfaces from said N interfaces based on bandwidth requested by said application to transmit data generated by said application to said second processor, where M is an integer and $1 \leq M \leq N$;
   buffering data generated by said application;
   splitting said data into first portions when M>1; and
   outputting said first portions to said M interfaces based on data rates of said M interfaces when M>1.

23. The method of claim 22, further comprising setting interfaces other than said M interfaces to one of low-power and power-off modes based on a predetermined amount of time that at least one interface of said N interfaces is not at least one of transmitting and receiving said data.

24. The method of claim 22, further comprising selecting R interfaces from P interfaces to
   transmit data to said first processor, wherein a first interface module includes said N interfaces, and a second interface module includes said P interfaces and communicates with said first interface, where R is an integer and $1 \leq R \leq P$, and where P is an integer greater than 1.

25. The method of claim 24, further comprising selecting said R interfaces to transmit data to said first processor based on a rate at which said second processor receives data from devices other than said first processor.

26. The method of claim 24, wherein P=N.

27. The method of claim 24, further comprising:
   reordering second portions of data received from said M interfaces in an order transmitted by said R interfaces;
   storing said second portions; and
   outputting said second portions to said application.

28. The method of claim 27, further comprising splitting said data into a plurality of portions based on a number said M interfaces and said R interfaces that are active.

29. The method of claim 24, further comprising:
   buffering data received from devices other than said first processor;
   splitting said data into second portions; and
   outputting said second portions to said R interfaces based on data rates of said R interfaces when R>1.

30. The method of claim 29, further comprising:
   reordering third portions of data received from said R interfaces in an order transmitted by said M interfaces; and
   storing said third portions for communicating said third portions to said devices.

31. The method of claim 30 further comprising:
   adding sequence identifiers to portions of data transmitted by said M interfaces when M>1; and
   reordering said portions received by said R interfaces based on said sequence identifiers.

* * * * *